(12) United States Patent
Czerwinski et al.

(10) Patent No.: US 9,798,021 B2
(45) Date of Patent: Oct. 24, 2017

(54) METHOD FOR CALIBRATION OF TOF-PET DETECTORS USING COSMIC RADIATION

(71) Applicant: UNIWERSYTET JAGIELLONSKI, Crakow (PL)

(72) Inventors: Eryk Czerwinski, Crakow (PL); Pawel Moskal, Czulowek (PL); Michal Silarski, Crakow (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 118 days.

(21) Appl. No.: 14/915,258

(22) PCT Filed: Aug. 29, 2014

(86) PCT No.: PCT/EP2014/068369
§ 371 (c)(1),
(2) Date: Feb. 29, 2016

(87) PCT Pub. No.: WO2015/028602
PCT Pub. Date: Mar. 5, 2015

(65) Prior Publication Data
US 2016/0209528 A1  Jul. 21, 2016

(30) Foreign Application Priority Data
Aug. 30, 2013 (PL) .................................. 405183

(51) Int. Cl.
*G01T 7/00* (2006.01)
*G01T 1/29* (2006.01)
(52) U.S. Cl.
CPC ............ *G01T 7/005* (2013.01); *G01T 1/2985* (2013.01)

(58) Field of Classification Search
CPC .............................. G01T 7/005; G01T 1/2985
USPC ......................................................... 250/252.1
See application file for complete search history.

(56) References Cited

U.S. PATENT DOCUMENTS

| | | | | |
|---|---|---|---|---|
| 5,272,343 A * | 12/1993 | Stearns | ............... | G01T 1/172 250/363.03 |
| 7,557,350 B2 * | 7/2009 | Muehllehner | ......... | G01T 1/2985 250/252.1 |
| 7,820,975 B2 * | 10/2010 | Laurence | ............. | G01T 1/2985 250/252.1 |
| 2016/0209514 A1 * | 7/2016 | Moskal | ................ | G01T 1/2985 |

(Continued)

*Primary Examiner* — David Porta
*Assistant Examiner* — Gisselle Gutierrez
(74) *Attorney, Agent, or Firm* — Mark M. Friedman

(57) ABSTRACT

A method for calibration of TOF-PET detectors comprising polymeric scintillator strips and photoelectric converters, wherein cosmic radiation is used as a source of radiation, the method comprising the steps of: recording times of reactions of particles of cosmic radiation with the scintillator strips (101, 411, 421, 511, 521); determining spectra (301) of distribution of differences in the times at which pulses are recorded at ends of the scintillator strips (101, 411, 421, 511, 521) connected to photoelectric converters (102, 103, 412, 413, 422, 423, 512, 513, 522, 523); using the determined spectra (301) to determine timing synchronization constants of the photoelectric converters (102, 103, 412, 413, 422, 423, 512, 513, 522, 523), the constants being related to: delays within the electronics; speed of light propagation within the scintillator strip of the detection module; and resolution of the difference in times of the signals recorded at the ends of the module.

7 Claims, 6 Drawing Sheets

(56) References Cited

U.S. PATENT DOCUMENTS

| | | | |
|---|---|---|---|
| 2016/0209523 A1* | 7/2016 | Moskal | G01T 1/2985 |
| 2016/0216380 A1* | 7/2016 | Moskal | G01T 1/2006 |
| 2016/0216385 A1* | 7/2016 | Moskal | G01T 1/2985 |
| 2016/0216386 A1* | 7/2016 | Moskal | G01T 1/2018 |

* cited by examiner

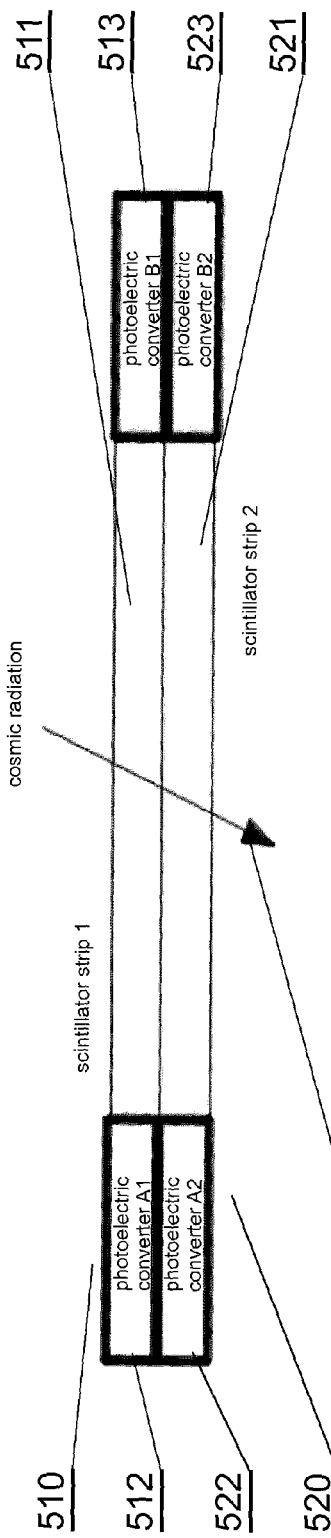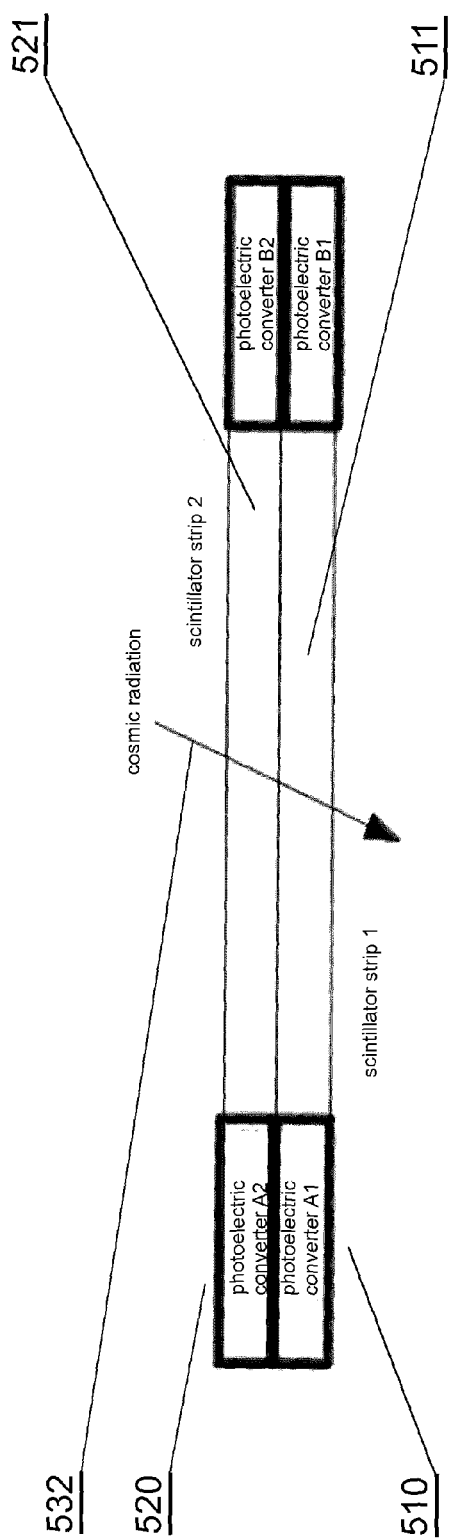
Fig. 5a
Fig. 5b

METHOD FOR CALIBRATION OF TOF-PET DETECTORS USING COSMIC RADIATION

TECHNICAL FIELD

The present disclosure relates to a method for timing and energy calibration of TOF-PET detectors using cosmic radiation.

BACKGROUND

Images of the interiors of bodies may be acquired using various types of tomographic techniques, which involve recording and measuring radiation from tissues and processing acquired data into images.

One of these tomographic techniques is positron emission tomography (PET), which involves determining spatial distribution of a selected substance throughout the body and facilitates detection of changes in the concentration of that substance over time, thus allowing to determine the metabolic rates in tissue cells.

The selected substance is a radiopharmaceutical administered to the examined object (e.g. a patient) before the PET scan. The radiopharmaceutical, also referred to as an isotopic tracer, is a chemical substance having at least one atom replaced by a radioactive isotope, e.g. $^{11}C$, $^{15}O$, $^{13}N$, $^{18}F$, selected so that it undergoes radioactive decay including the emission of a positron (antielectron). The positron is emitted from the atom nucleus and penetrates into the object's tissue, where it is annihilated in reaction with an electron present within the object's body.

The phenomenon of positron and electron annihilation, constituting the principle of PET imaging, consists in converting the masses of both particles into energy emitted as annihilation photons, each having the energy of 511 keV. A single annihilation event usually leads to formation of two photons that diverge in opposite directions at the angle of 180° in accordance with the law of conservation of the momentum within the electron-positron pair's rest frame, with the straight line of photon emission being referred to as the line of response (LOR). The stream of photons generated in the above process is referred to as gamma radiation and each photon is referred to as gamma quantum to highlight the nuclear origin of this radiation. The gamma quanta are capable of penetrating matter, including tissues of living organisms, facilitating their detection at certain distance from object's body. The process of annihilation of the positron-electron pair usually occurs at a distance of several millimeters from the place of the radioactive decay of the isotopic tracer. This distance constitutes a natural limitation of the spatial resolution of PET images to a few millimeters.

A PET scanner comprises detection devices used to detect gamma radiation as well as electronic hardware and software allowing to determine the position of the positron-electron pair annihilation event on the basis of the position and time of detection of a particular pair of the gamma quanta. The radiation detectors are usually arranged in layers forming a ring around object's body and are mainly made of an inorganic scintillation material. A gamma quantum enters the scintillator, which absorbs its energy to re-emit it in the form of light (a stream of photons). The mechanism of gamma quantum energy absorption within the scintillator may be of dual nature, occurring either by means of the Compton's effect or by means of the photoelectric phenomenon, with only the photoelectric phenomenon being taken into account in calculations carried out by current PET scanners. Thus, it is assumed that the number of photons generated in the scintillator material is proportional to the energy of gamma quanta deposited within the scintillator.

When two annihilation gamma quanta are detected by a pair of detectors at a time interval not larger than several nanoseconds, i.e. in coincidence, the position of annihilation point along the line of response may be determined, i.e. along the line connecting the detector centers or the points within the scintillator strips where the energy of the gamma quanta was deposited. The coordinates of annihilation place are obtained from the difference in times of arrival of two gamma quanta to the detectors located at both ends of the LOR. In the prior art literature, this technique is referred to as the time of flight (TOF) technique and the PET scanners utilizing time measurements are referred to as TOF-PET scanners. This technique requires that the scintillator has a time resolution of a few hundred picoseconds.

Currently, the state of the art methods of determining the places of interactions of the gamma quanta in positron emission tomography are based on the measurements of charges of signals generated in vacuum tube photomultipliers, silicon photomultipliers, or avalanche diodes optically connected to inorganic crystals notched into smaller elements. Position of the gamma quantum reaction is determined with the accuracy of the smaller crystal element size on the basis of the differences in changes of the signals from different converters optically connected to the same crystal. In the state of the art PET scanners, reconstruction of the set of LOR and TOF data is based on the relationships between charges and times of signals recorded for a particular event without reference to external signals.

In the signal time determination methods used in the state of the art, changes in shapes and amplitudes of signals depending on the place of ionization and the quantity of energy constitute a limitation in temporal resolutions that can be achieved using the technique. The larger the scintillator, the larger the variations in signal shapes and amplitudes.

For the above, reasons, temporal resolutions of less than 100 ps are unattainable in the state of the art for large scintillator blocks. Temporal resolution also translates on the resolution of ionization position determination. In case of polymer scintillators (preferred due to their low price), amplitudes of signals generated by the gamma quanta, including annihilation gamma quanta used in positron emission tomography, are characterized by continuous distribution resulting from interactions between gamma quanta and electrons occurring mostly via the Compton effect with a negligibly low probability of a photoelectric effect. As a consequence, signal amplitudes in polymer scintillators may change even if they originate from the same position.

As shown by the shortcomings of the state of the art signal analysis techniques, there is a need to significantly improve temporal and spatial resolution in the detectors used in medical diagnostic techniques that require recording of ionizing radiation. The need to improve resolution is particularly high in large-sized detectors. Examples of PET detectors making use of large polymeric scintillators were described in patent application WO 2011/008119 as well as in patent application WO 2011/008118. Solutions described in these applications are based on the measurements of the times of light pulses arrival to the detector edges. Light pulses are converted into electric pulses by means of photomultipliers. The shape (temporal distribution of photons) and the amplitude of the light pulse reaching the photomultiplier changes depending on the distance between the photomultiplier and the pulse origin place. In addition and independently of the ionization place, the amplitude of the signal changes with the energy deposited within the detector. As a consequence, due to variations in signal shapes and amplitudes, it is impossible to achieve good temporal resolution using either leading edge or constant fraction discriminators of the current state of the art due to the time walk effect and the pulse shape change effect observed in large-size scintillators.

PET detectors require time and energy calibration that is carried out using radioactive isotopes such as $^{22}$Na or $^{68}$Ge, placed in precisely defined positions within a PET scanner, for example in the geometric center of the scanner or used as a mobile radiation sources rotating around the scintillation chamber, facilitating relative synchronization of all detection elements.

Methods for energy calibration of the detection systems in TOF-PET scanners are known in patent literature.

U.S. Pat. No. 7,414,246 and U.S. Pat. No. 7,820,975 disclose methods of timing calibration of detectors in TOF-PET scanners wherein sodium isotope placed in a metal or plastic shield is used as the radiation source and the annihilation quanta scattered at the shield are used for determination of the relative delays of individual detection modules within the PET scanner.

The U.S. Pat. No. 7,557,350 discloses a method of temporal synchronization of TOF-PET detectors wherein several radioactive sources are used at the same time, facilitating timing calibration of TOF-PET scanners to be carried out even while acquiring object images. The gamma quanta originating from the calibration sources according to the disclosed method are discriminated on the basis of the known positions of the energy sources as well as the timing information from detectors, which additionally permits discarding these events when reconstructing tomographic images.

The U.S. Pat. No. 5,272,343 discloses a method for synchronization of PET detectors making use of the orbiting of a radiation source. The annihilation gamma quanta from the moving radioactive source facilitate synchronization of PET scanned detector pairs by making use of the fact that in the case of the radiation source orbiting around the PET scanner axis, the difference in times of recording these quanta by two detectors located opposite each other is constant regardless of the position of the source within the scanner.

However, the described methods for calibration of detectors used in TOF-PET scanners do not permit calibration of detectors while acquiring object scans without the risk of exposing the object to an additional dose of radiation emitted by the radioactive sources used for calibration. In addition, the use of radioactive sources for synchronization of TOF-PET detectors requires additional equipment, trainings of personnel operating TOF-PET scanners and replacement of the sources as they decline in activity (for example, the half-life of $^{68}$Ge decay is about 270 days), thus increasing the imaging costs. Currently, calibration of TOF-PET detection systems are usually performed once a day before acquiring object scans so as to avoid the object's exposure to additional radiation; however, this method does not allow consideration of the changing ambient conditions, i.e. fluctuations in temperature or voltage that may affect temporal or energy properties of TOF-PET detectors while shortening the time devoted to the scanning of individual objects. In addition, the aforementioned methods for TOF-PET calibration are not convenient when using long TOF-PET detectors as employed in strip or matrix TOF-PET scanners disclosed in patent applications WO 2011/008119 and WO 2011/008118, where polymeric scintillation material has been used in the form of long strips or plates connected to photomultiplier systems for recording the annihilation quanta.

It would be expedient to develop a method for calibration of TOF-PET detectors and monitoring of the quality of the detection system that would facilitate continuous monitoring of the detection system and simultaneous calibration of TOF-PET detectors while performing imaging scans and not requiring the use of additional radiation sources.

SUMMARY

There is presented a method for calibration of TOF-PET detectors comprising polymeric scintillator strips and photoelectric converters, wherein cosmic radiation is used as a source of radiation, the method comprising the steps of: recording times of reactions of particles of cosmic radiation with the scintillator strips; determining spectra of distribution of differences in the times at which pulses are recorded at ends of the scintillator strips connected to photoelectric converters; using the determined spectra to determine timing synchronization constants of the photoelectric converters, the constants being related to: delays within the electronics; speed of light propagation within the scintillator strip of the detection module; and resolution of the difference in times of the signals recorded at the ends of the module.

Preferably, the method comprises measuring a charge ($Q_A$, $Q_B$) at the ends of the scintillator connected to the photoelectric converters, wherein the charge is a result of the reaction of the particle of cosmic radiation with the scintillator and determining an effective light pulse attenuation length and amplification coefficients of the photoelectric converters to be used to determine calibration constants of energy synchronization of the detectors.

Preferably, the method comprises determining a reference function separately for each detector by measuring charges ($Q_A$, $Q_B$) that correspond to losses in energy being deposited at distinct, precisely identified positions of reactions of the particles of cosmic radiation (x).

Preferably, the method comprises mutually calibrating at least two TOF-PET detectors by measuring the time of flight of the particle of cosmic radiation across the scintillators of two detectors; determining the distance traveled by the particle between two scintillator strips; and determining relative time delays between the detection modules on the basis of a difference between the measured time of flight of the particle and the time of flight calculated from the distribution of particle speeds at Earth's surface.

Preferably, the method comprises mutually calibrating at least two TOF-PET detectors by: acquiring reference spectra of times of flight of particles of cosmic radiation across two detectors; wherein the reference spectra are acquired by determining times of flight of the particles between two scintillators aligned in parallel one over the other, acquiring of the spectra of times of flight of the particles between the detectors, inverting the order of detectors and acquiring the reference spectra of times of flight of the particles between the same scintillators aligned in parallel one over the other in a reverse order, and subsequently acquiring reference spectra of the times of flight of the particles between the detectors; wherein the values of the delays of the detection modules are selected by fitting the spectra of the times of flight of the particles across the two detectors to the reference spectra of the times of flight of the particles with the detection module pair delays as free fitting parameters.

Preferably, the spectra of the particle speeds are fitted to the reference spectra of the particle speeds.

Preferably, the reference spectra are acquired for any configuration of detector pairs within the TOF-PET scanner.

BRIEF DESCRIPTION OF FIGURES

Example embodiments are presented on a drawing wherein:

FIGS. 5a and 5b present an outline of the method for timing calibration of the assembly of detection modules without the knowledge of the temporal distribution of the times of flight of the cosmic radiation particles;

DETAILED DESCRIPTION

Figure 1:
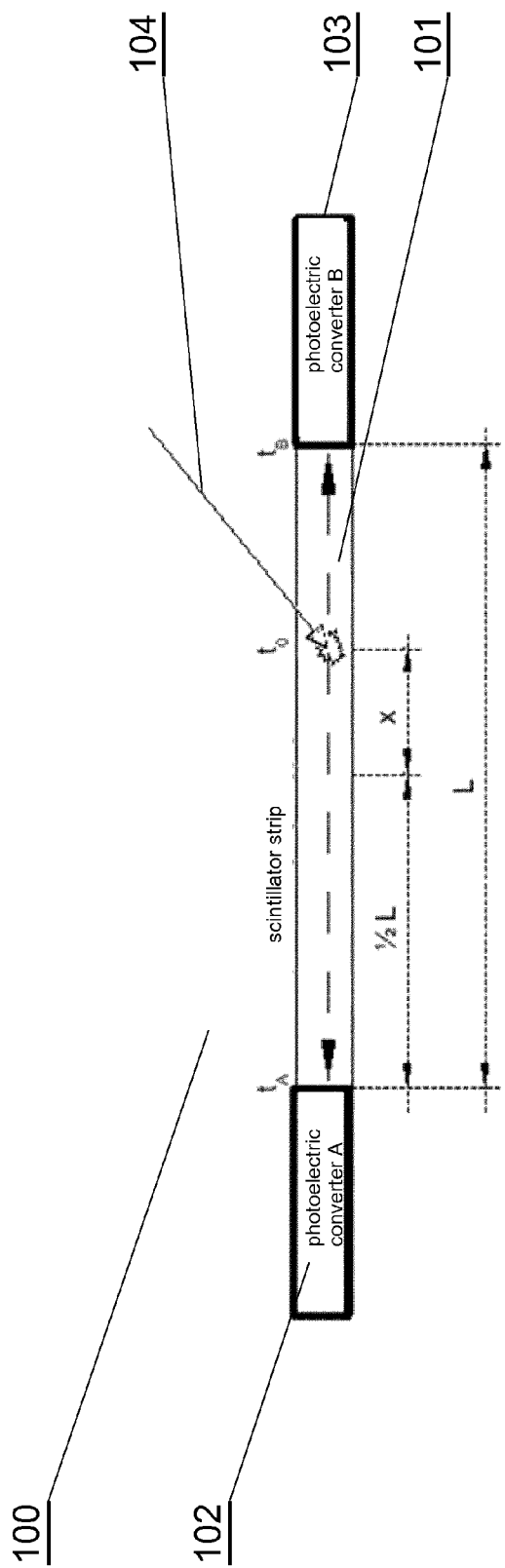
FIG. 1 presents an outline of the detection module and a method for timing calibration of TOF-PET scanners.

The method for timing and energy calibration of the TOF-PET scanner detection system facilitates synchronization of the TOF-PET detection modules with polymer scintillation strips, the design and function whereof are known to those skilled in the art. FIG. 1 presents a schematic outline of an example TOF-PET detector 100. The TOF-PET detector 100 consists of a scintillator strip 101 and two photoelectric converters 102, 103, for example photomultipliers optically connected to the ends of the scintillator strip 101. In a standard manner, TOF-PET detector 100 records the times of arrival of the light pulses generated by the gamma quanta absorbed by the scintillator strip 101 as is the case for example in TOF-PET scanners with polymer scintillator strips known to those skilled in the art. The light pulses caused by the reaction of cosmic radiation 104 within the scintillator may propagate to the edges of the strip 101 and may be converted to electric pulses by photoelectric converters 102, 103. In case of detectors 100 with large-sized scintillator strips 101, the shapes of the light pulses arriving to the edges of a scintillator strip 101 vary depending on the distance between the place where the light pulse was generated (reaction place) and the photoelectric converter 102, 103. In addition, the amplitude of the signal may vary depending on the energy being deposited by the radiation particle within the scintillator strip 101.

Figure 2:
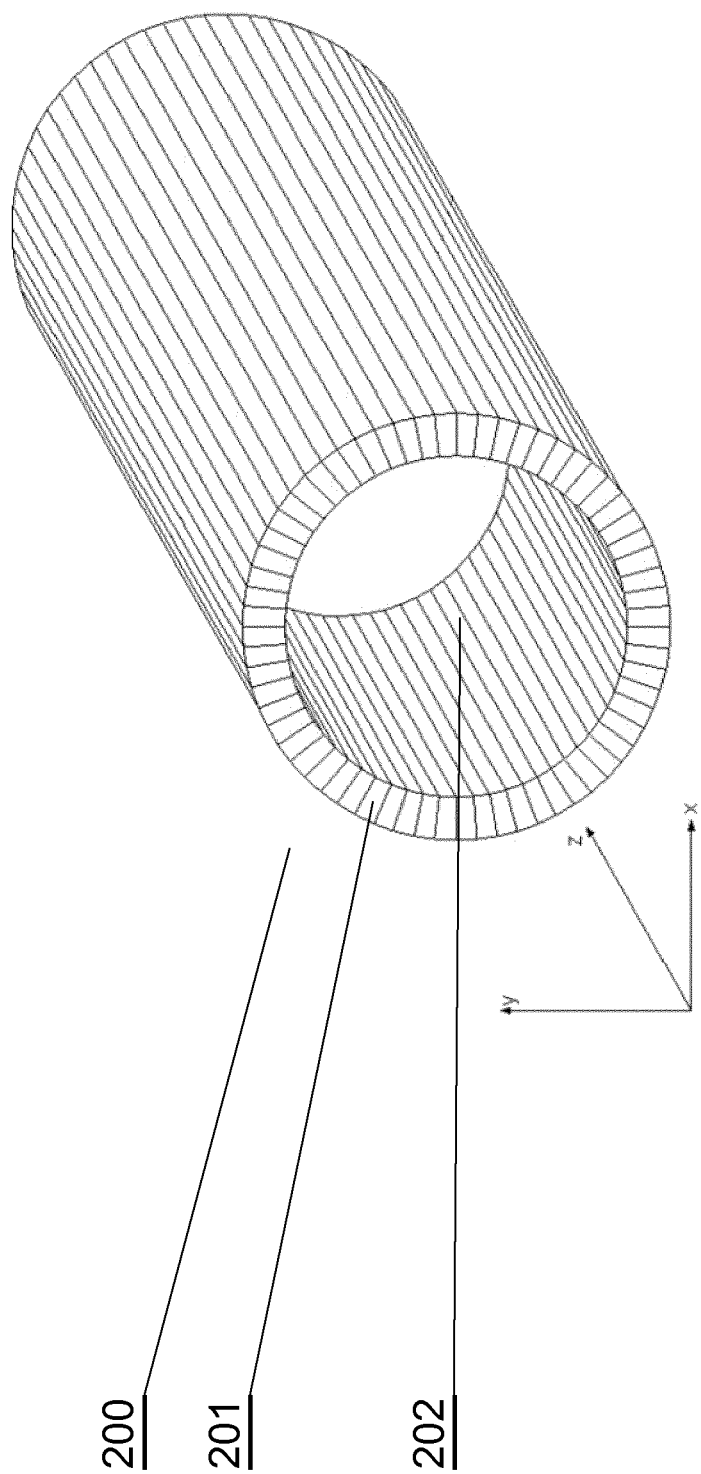
FIG. 2 presents an outline of a TOF-PET scanner including a detection system containing a detection layer with TOF-PET modules.

FIG. 2 presents an outline of a conventional TOF-PET scanner 200 with TOF-PET detectors 201 comprising polymer scintillator strips and photomultipliers (not shown in FIG. 2). Detectors 201 are distributed along the circumference of the scintillation chamber 202 of the TOF-PET scanner 200, in parallel to the longitudinal axis of the scanner 200, forming a detection system for recording annihilation quanta and acquiring metabolic images of object who is introduced into the scintillation chamber 202 for acquisition of the images of the metabolism of object's organs.

In the presented method, cosmic radiation that naturally occurs at the Earth's surface is used for timing and energy calibration of detection modules 100, 201 as those schematically outlined in FIGS. 1, 2, for example as those used in TOF-PET scanners 200 and comprising the gamma radiation detection layers. Similar as the gamma radiation, the cosmic radiation is an ionizing radiation and while passing through the material of the scintillator 101, 201, the particles of cosmic radiation may deposit part of their energy within the scintillator, generating light pulses.

In order to perform timing synchronization of a single TOF-PET detection module 100, 201, light pulses generated by cosmic radiation particles within the scintillator 101 are recorded using the presented method as shown by the arrow 104 in FIG. 1. The presented method is used mainly for the registering of muon reaction times; however, it may also be used to record light pulses generated by any cosmic radiation particles that may be recorded by a TOF-PET detection system.

The times of the registration of light pulses are calculated from the following formula:

$$t_{A(B)} = t_0 + t^p_{A(B)} + t^o_{A(B)} \quad \text{(formula I)}$$

where:
$t_0$—time of the reaction of a cosmic radiation particle with the scintillator strip (calculated relative to a shared clock)
$t^p_{A(B)}$—time of propagation of the light pulse across the scintillator to the photoelectric converter A or photoelectric converter B, respectively.
$t^o_{A(B)}$—time of pulse generation and the time required for the pulse to travel from the photoelectric converter A or B to the last element of the recording electronics.

The sum of the times of propagation of the light pulse to the photoelectric converter A 102 and to the photoelectric converter B 103 is equal to the product of the length of the scintillator strip (L) in which the reaction of the cosmic radiation particle took place and the inverse of the speed of propagation (v) of said light pulse according to the following formula:

$$t^p_A + t^p_B = L/v \quad \text{(formula II)}$$

where:
L—length of the scintillator strip
v—light pulse propagation strip

The difference in times of registration of light pulses ($\Delta t_{AB} = t_A - t_B$) at both ends of strip 101 is used to determine the place of the reaction (x) of the cosmic radiation particle with the scintillator strip 101 wherein said place of reaction of the cosmic radiation particle is measured from the center of strip 101 (L/2) according to the following formula:

$$x = v/2(\Delta t_{AB} - \Delta t^o_{AB}) \quad \text{(formula III)}$$

where:
$\Delta t^o_{AB}$—difference in delays defined as $\Delta t^o_{AB} = t^o_A - t^o_B$
$\Delta t_{AB}$—difference in the times of signal being recorded by photoelectric converters A and B, defined as: $\Delta t_{AB} = t_A - t_B$ The presented method is used to determine the speed of propagation of the light pulses within the scintillator strip 101 (v) and the difference in the delays of recording ($\Delta t^o_{AB}$) from the distribution of time differences $\Delta t_{AB}$ separately for each detection module.

Figure 3:
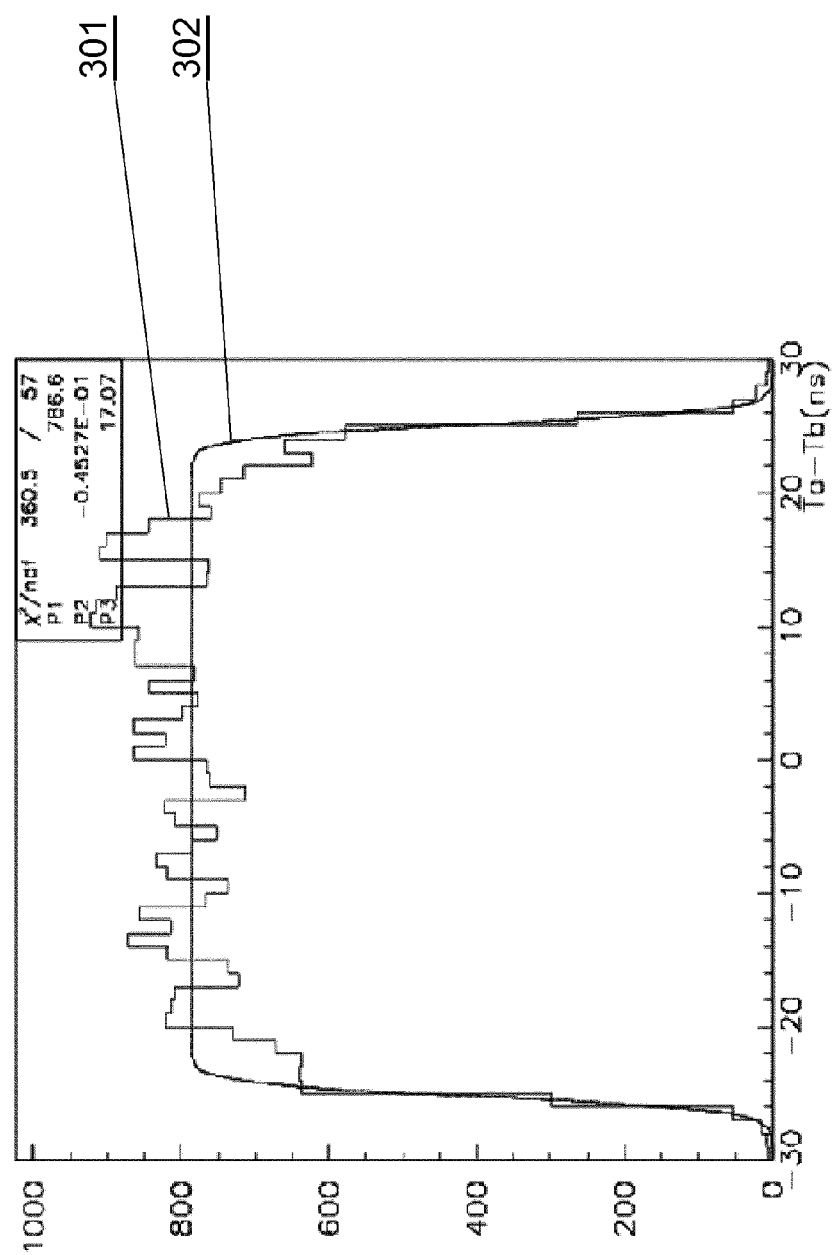
FIG. 3 presents a spectrum of the difference in the times of recording the light pulses at both ends of the polymer scintillator strip.

The calculated distributions of time differences $\Delta t_{AB}$ are used to generate spectra 301 of the distributions of the differences in the times of recording the light pulses at both ends of the scintillator strip ($\Delta t_{AB}$). An example $\Delta t_{AB}$ is presented in FIG. 3. Due to the uniform intensity of the cosmic radiation, the distribution of the differences in the times of recording the light pulses at both ends of the scintillator strip ($\Delta t_{AB}$) is principally homogeneous and limited, wherein the set of the values of the distribution of the time differences ($\Delta t_{AB}$) may be defined as:

$$\Delta t_{AB} \in \left[\Delta t^o_{AB} - \frac{L}{v}; \Delta t^o_{AB} + \frac{L}{v}\right].$$

At the next stage, a theoretical curve 302 is fitted to the spectrum of the distribution of the time differences ($\Delta t_{AB}$) 301, said curve for example being: a difference of cumulative functions of Gaussian distribution or a product of Fermi distribution functions. The fitting of the theoretical curve 302 yields the values of $\Delta t^o_{AB}$ and v. In addition, the results of the fitting procedure may include additional parameters that facilitate estimation of the accuracy of the measurements of the time difference ($\Delta t_{AB}$). For example, for the fitted function of the following formula:

$$N(\Delta t_{AB}) = \frac{A}{\left\{1 + \exp\left[\left(-\Delta t_{AB} + \Delta t^o_{AB} - \frac{L}{v}\right)/\sigma_t\right]\right\}} \quad \text{(formula IV)}$$
$$\left\{1 + \exp\left[\left(\Delta t_{AB} - \Delta^o_{AB} - \frac{L}{v}\right)/\sigma_t\right]\right\}$$

an additional parameter $\sigma_t$ acting as the measure of temporal resolution achieved by the detection module may be determined. The values of the additional parameters, such as $\Delta t^o_{AB}$, facilitate synchronization of (readout electronics) channels within a single detection module 100, and consequently determination of the place of the reaction of a cosmic radiation particle (x) within the scintillator strip 101 measured from the strip center (L/2).

Figure 4:
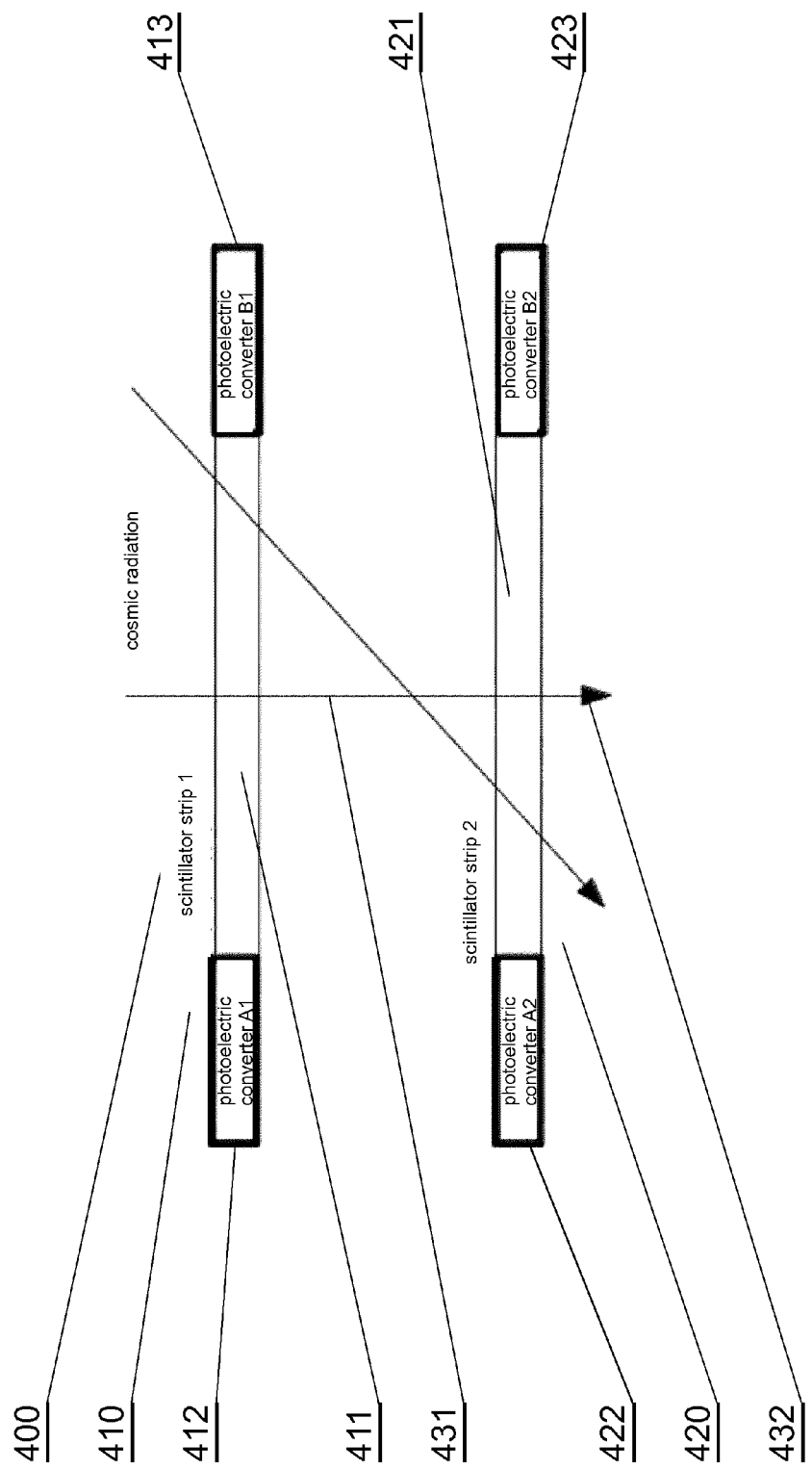
FIG. 4 presents an outline of the method for timing calibration of the assembly of detection modules employing the data concerning the temporal distribution of the times of flight of the cosmic radiation particles.

The presented method may also be used to carry out energy calibration of the entire detection system containing multiple detection modules 100. FIG. 4 presents an outline of a detection system 400 consisting of two detection modules 410, 420. Each detection module 410, 420 of the detection system 400 consists of a polymer scintillator strip 411, 421 optically connected to a pair of photoelectric converters 412, 413 and 422, 423.

For a detection system 400 consisting of multiple detection modules, timing synchronization is carried out on the basis of the measurements of the times of flight of the cosmic radiation particles between the pairs of scintillator strips 411, 421 separated by an appropriately chosen minimum distance, for example at least 30 cm. For each scintillation strip 411, 421 within a pair, places of the reactions of the cosmic radiation particle (x) that permeated both these strips are calculated. In the next step, distance (d) traveled by said cosmic radiation particle between the places of the reaction (x) in two opposite scintillator strips 411 and 421 is determined. Since the distribution of the cosmic particle speeds at the Earth's surface is known, the difference between the measured time of flight of the cosmic radiation particle between two scintillator strips 411, 421 and the predicted speed value is used to estimate the values of relative delays between modules 410, 420 of the detection system 400.

In addition, in order to achieve high precision of timing synchronization of the detection system 400, the procedure described above may be carried out also for cosmic radiation particles penetrating pairs of scintillator strips 411, 421 at different angles, as schematically indicated in FIG. 4 by arrows 431, 432. Estimation of the delays in the detection module pairs 410, 420 facilitates acquisition of data that permit global synchronization of the entire detection system 400.

The timing synchronization of the detection system consisting of at least two detection modules may be also performed without the knowledge of the distribution of cosmic radiation particle speeds. To this end, the reference spectra of the cosmic radiation particle speeds or the cosmic radiation particle times of flight are obtained, wherein the delays of the detection module pairs are selected so that the spectra of the speed or the time of flight of the cosmic radiation particles measured using individual scintillator strip pairs are matched to reference spectra with the detection module pair delay as the free fitting parameter.

FIGS. 5a, 5b present a method for determination of reference spectra using the presented method. At the first stage (FIG. 5a), spectrum of the difference in the times of flight of the cosmic radiation particles between the upper strip 511 and the lower strip 521 arranged in parallel one over the other is acquired; then, the order of strips is inverted (FIG. 5b) and a spectrum of the times of flight of the cosmic radiation particles between the upper strip 521 and the lower strip 511 arranged in parallel one over the other in the reverse order is acquired, wherein the arrow heads 531, 532 in FIGS. 5a, 5b mark the direction of the flight of cosmic radiation particles.

Following synchronization of the detection modules 510, 520, the scintillator strips 511 and 521 are pulled apart and placed at a distance and at an angle corresponding to the positioning of strips 511, 521 within the TOF-PET 200 scanner (FIG. 2), whereas the reference spectra of the speeds and the times of flight of the cosmic radiation particles may be acquired for any configuration of strip pairs 511, 521 within the TOF-PET scanner 100.

Using the presented method, the cosmic radiation reaching the Earth's surface may also be used for energy calibration of TOF-PET detectors 100, 201, 410, 420, 510, 520. To this end, the electric charges of signals generated by the reactions of cosmic radiation particles with scintillator strips are measured. The $Q_A$ and $Q_B$ values of the charges obtained in the conversion of a light pulse within the photoelectric converters of the TOF-PET detectors 100 depend on the energy deposited by the cosmic radiation particle within the scintillator ($E_d$) and the position of the reaction of said particle (x) within the scintillator strip, which may be expressed using the following formula:

$$Q_{A(B)}(E_d, x) = \beta_{A(B)} f(x) E_d \quad \text{(formula V)}$$

where:

$\beta_A$, $\beta_B$—energy calibration constants that express quantum efficiencies of photocathodes of photoelectric converters A and B and amplification coefficients of converters A and B f(x)—reference function Constants $\beta_A$ and $\beta_B$ depend on the photoelectric converter's supply voltage; preferably, amplification coefficients of all photoelectric converters are approximately identical. Therefore, energy calibration using the presented method may be divided into two independent procedures.

The first procedure consists in monitoring the photoelectric converter amplification coefficients and adjusting new converter supply voltages so as to obtain the desired amplification. For instance, amplification unification procedure may consist in comparing the spectra of the charges of signals from the region around the center of the scintillator strip to reference spectra acquired separately for each angular position of the scintillator strip, wherein the places of reactions of cosmic radiation particles within the scintillator strip are determined based on the differences in the times of the arrival of signals to photoelectric converters at both ends of the scintillator strip. Next, on the basis of previously determined relationships between amplification coefficients and voltages attached to each photoelectric converter, new supply voltage values are calculated.

The second procedure consists in determining the energy calibration constants $\beta_A$ and $\beta_B$ that permit calculation of the energy deposited within the scintillators ($E_d$) by cosmic radiation particles from the measurements of charges ($Q_A$, $Q_B$) recorded by the detection system of the TOF-PET scanner 200.

The reference function (x) introduced to formula V is approximately the same for all detection modules, wherein said function may be analytically approximated, for example by the following formula:

$$f(x) = e^{-\lambda\left(x+\frac{L}{2}\right)} \qquad \text{(formula VI)}$$

where:
f(x)—reference function
$\lambda$—effective scintillator absorption distance
Approximation described by formula VI is very good, with the exception of several-centimeter-wide areas near the ends of the scintillator strips (in the vicinity of photoelectric converters).

The reference function f(x) may in addition be determined separately for each detection module, for example by measuring the $Q_A$ and $Q_B$ charges for identical losses in energy deposited at different, precisely defined places of the reactions of cosmic radiation particles (x).

In order to quickly monitor the energy calibration of individual scintillator strips using the presented method, the relationship between the ratio of the recorded charges and the calculated place of the reaction between the cosmic radiation particle and the strip (x) may be used:

$$\ln\left(\frac{Q_A}{Q_B}\right) = -2\lambda x + \ln\left(\frac{\beta_A}{\beta_B}\right) \qquad \text{(formula VII)}$$

Based on the relationship of formula VII, the relationship between the logarithm of the average ratio of charges: $Q_A$, $Q_B$ and the position in the scintillator strip is determined, wherein the areas near (several centimeters away from) the ends of the scintillator strips are excluded from the analysis. A function, for example a linear function, is fitted to the above relationship, facilitating direct estimation of the effective light absorption distance $\lambda$ and therefore monitoring of the quality of the scintillator material.

For equal photomultiplier amplification coefficients the expression ln ($\beta_A/\beta_B$) is equal to zero, leading to the conclusion that the analysis of the relationship ln ($Q_A/Q_B$)·(x) would facilitate monitoring of the amplification coefficients of photoelectric converters and making decisions regarding adjustments of these coefficients by definite values, for example when ln ($\beta_A/\beta_B$) is different from zero.

The distribution expressed as ln ($Q_A/Q_B$) may also be determined using the presented method by neglecting the relationships between the places of reactions of the cosmic radiation particles (x), similar as in the case of the time differences, by fitting a theoretical curve to the ln ($Q_A/Q_B$) distribution, for example a curve described by the following formula:

$$f\left(\ln\left(\frac{Q_A}{Q_B}\right)\right) = \frac{N}{\left\{1+\exp\left[\left(-\ln\left(\frac{Q_A}{Q_B}\right)\lambda L + \ln\left(\frac{\beta_A}{\beta_B}\right)\right)/\sigma_Q\right]\right\}} , \qquad \text{(formula VIII)}$$
$$\left\{1+\exp\left[\left(\ln\left(\frac{Q_A}{Q_B}\right) - \lambda L - \ln\left(\frac{\beta_A}{\beta_B}\right)\right)/\sigma_Q\right]\right\}$$

On the other hand, according to the other procedure for determination of energy calibration constants $\beta_A$, $\beta_B$, that facilitate determination of the energy deposited within the scintillators by the cosmic radiation particles ($E_d$) on the basis of the measured charges of the recorded signals, absolute energy scale is determined from the weighted average of charges measured at both ends of the strip: $\sqrt{Q_A Q_B}$, wherein the energy value is proportional to the energy deposited within the scintillator ($E_d$):

$$\sqrt{Q_A Q_B} = \beta E_d e^{(-\lambda L/2)} \qquad \text{(formula IX)}$$

where:
$\sqrt{Q_A Q_B}$—weighted average of charges measured at both sides of the scintillator strip
whereas the above equation (formula IX) may be written down as:

$$\sqrt{Q_A Q_B}\, C = E_d \qquad \text{(formula X)}$$

where:
C—calibration constant, determined separately for each detection module.

The energy deposited within the scintillator strip by a cosmic radiation particle depends on the distance traveled by this particle within the scintillator strip. For this reason, the distribution $\sqrt{Q_A Q_B}$ is determined for cosmic radiation within a small solid angle around the $\theta=0°$ in relation to the vertical direction or, in the case of wider angles, the value $\sqrt{Q_A Q_B}$ is normalized to the distance traveled by the radiation within the scintillator strip. Likewise, based on the values of distributions of the cosmic radiation particle energy losses, a value normalized to the distance traveled by the cosmic radiation particle within the scintillator is used for calculating the energy deposited within the scintillator ($E_d$). Since the distribution of the energy losses of cosmic radiation particles permeating the scintillation strips depends on the incidence angle ($\theta$), the range of incidence angles is discretized and the mean values $\langle \sqrt{Q_A Q_B} \rangle$ and $\langle E_d \rangle$ are determined separately for each range $\theta$. In the next stage, calibration constants C are calculated separately for each range $\theta$ using the following formula:

$$\langle \sqrt{Q_A Q_B} \rangle C = \langle E_d \rangle \qquad \text{(formula XI)}$$

The final value of the calibration constant C is calculated as a weighted average of C values obtained for individual ranges $\theta$.

In addition, determination of $\langle \sqrt{Q_A Q_B} \rangle$ and $\langle E_d \rangle$ values for several values of $\theta$ makes it possible to monitor the systematic uncertainties of determination of the calibration constant C.

In addition, absolute energy calibration of the detection system using the presented method may be carried out without the knowledge of the distribution of the energy losses of cosmic radiation particles. In this case, before assembling the TOF-PET detectors into a detection system, for example before assembling the TOF-PET detectors into a tomography scanner, absolute calibration is performed using several different sources of radiation (e.g. collimated $^{22}$Na and $^{137}$Cs sources applied at several spots along the strip) and then the reference spectra of the cosmic radiation energy deposited within the scintillation strip are determined. Next, the TOF-PET detection system is assembled, activated and calibrated in a manner consisting in selection of calibration constants C such that the spectrum of the energy deposited by cosmic radiation particles acquired during calibration matched the reference spectrum.

Figure 6:
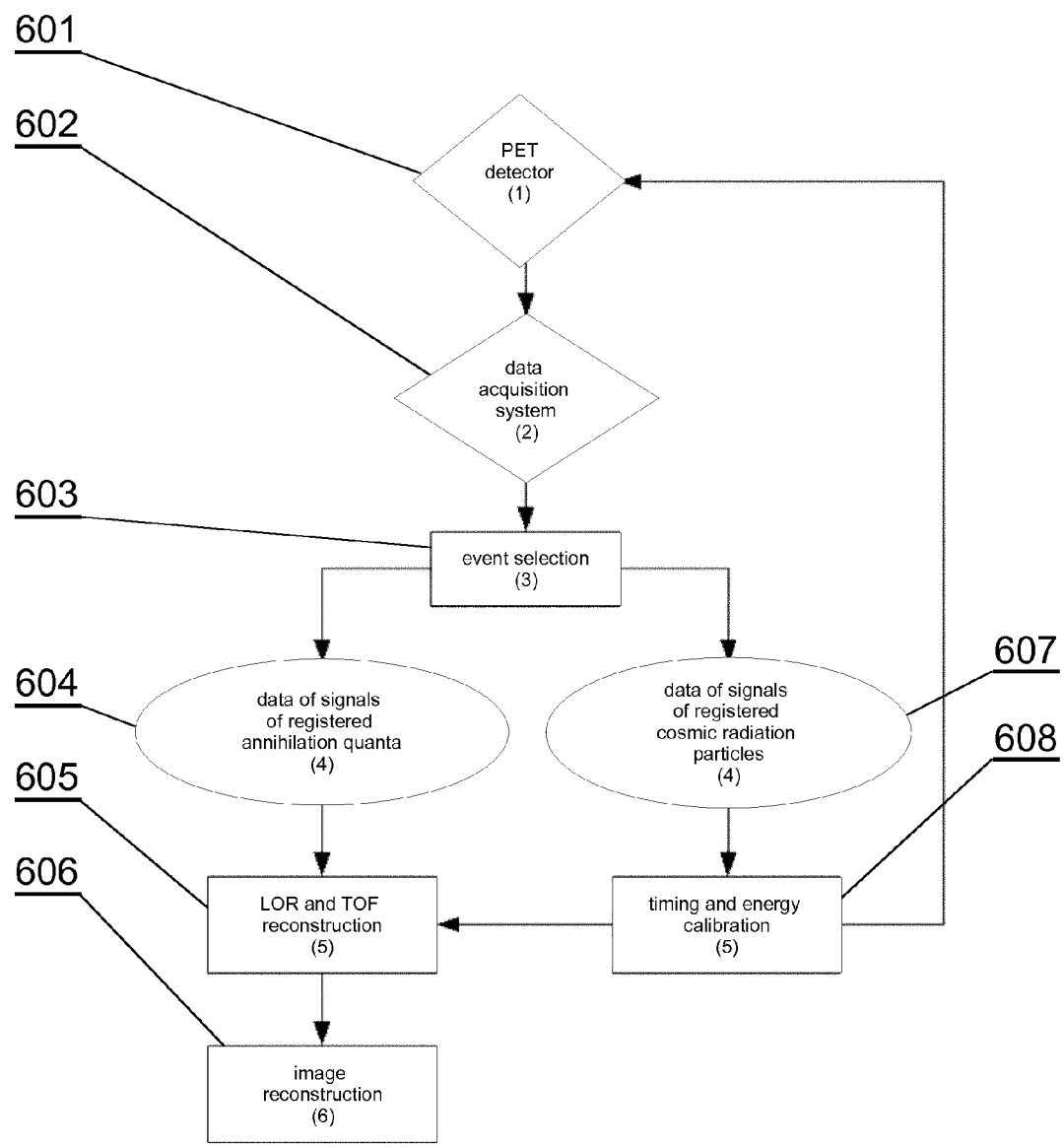
FIG. 6 presents a block diagram of the procedure for the monitoring of timing and energy calibration of a TOF-PET scanner detection system.

FIG. 6 outlines an example procedure that can be used to monitor the detection system including a TOF-PET scanner for reconstruction of cellular metabolism images. Data from the TOF-PET detector 601 are collected by the data acquisition system 602 and simultaneously analyzed on the basis of specific calibration constants. Based on the calculated energy losses and the times of flight of the cosmic radiation particles between the detection modules, the events are sorted into two categories by the sorting procedure 603. Events that correspond to the signals generated by the gamma quanta are recorded for reconstruction 605 of the line of response (LOR) and the time of flight (TOF) followed by reconstruction of the metabolic image 606 of the scanned object are recorded onto an appropriate data carrier 604 while the other group of events corresponding to cosmic radiation is recorded within a separate memory storage 607 and used on current basis for timing and energy calibration of the detection system 601. The energy and timing calibration constants resulting from procedure 608 may be used by the LOR and TOF reconstruction procedures 605, and, simultaneously, may be used in such manner that in case unacceptable amplification deviations are detected, procedure 608 calculates new voltage values for the photoelectric converters and sends information regarding the decision to load the new voltage values into the power supply system, or else the procedure 608 can automatically load the new voltage values into the power supply system during the interval between object scans.

The monitoring of the operation of the TOF-PET detection system using the presented method may be carried out during object scans or between object scans as necessary, with frequent timing and energy calibration of the TOF-PET detectors providing an opportunity of early detection of both discrepancies in the operation of photoelectric converters and deterioration of the properties of the scintillation material that consequently affect the quality of images acquired using the TOF-PET detectors.

The use of cosmic radiation instead of conventional radioactive isotopes for synchronization of PET-TOF detectors additionally allowed for the access to practically unlimited number of particles flying through TOF-PET measurement system at incidence angles in the range of 0°-90°. The measurement of the times of the arrival of light pulses at both ends of the TOF-PET scintillator strips facilitated generation of a spectrum of the differences of these times which, combined with the information on the geometrical dimensions of the scintillator, allowed to determine time constants required for timing synchronization of the system of photomultipliers connected to the scintillators.

After separate timing calibration of each of the detectors, one may use the same data to synchronize operation of the entire system of TOF-PET detectors, for example a detection system of a TOF-PET scanner for reconstruction of metabolic images.

The use of cosmic radiation also allowed for energy calibration of TOF-PET detectors by means of the measurement of charges of pulses generated by cosmic radiation particles at the ends of the scintillation strips. The natural logarithm of the ratio of charges and the knowledge of the places of reactions of cosmic radiation particles within the scintillation strips facilitated determination of the effective light pulse attenuation length within the scintillators, as well as the amplification coefficients of photoelectric converters such as photomultipliers, and monitoring the changes of these values over time.

In addition, determination of the effective light pulse attenuation length using the presented method allowed to monitor the quality of detector operation and detection of potential deterioration of the quality of the scintillation material and the quality of the optical connection between the scintillator and the photoelectric converters.

The obtained spectra of charges of the signals caused by cosmic radiation passing through scintillators and the knowledge of the distribution of the losses of cosmic radiation energy within the scintillator material permitted determination of calibration constants that allow to convert the charges of the recorded signals into the energy deposited within the scintillator.

An unquestionable advantage of the use of cosmic radiation for timing and energy calibration of detectors used in the detection systems of TOF-PET scanners is also the lack of the necessity of using any additional radiation sources, which allows to reduce the costs of metabolic images as well as to monitor and calibrate the TOF-PET detectors while scanning a object without exposing the object to an additional radiation dose.

The capability of continuous calibration of TOF-PET scanners using the presented method also allows for taking into account any changes in atmospheric conditions, such as temperature changes and other coefficients that may affect operation of TOF-PET scanners.

While the technical solutions presented herein have been depicted, described, and defined with reference to particular preferred embodiment(s), such references and examples of implementation in the foregoing specification do not imply any limitation on the invention. Various modifications and changes may be made thereto without departing from the scope of the technical solutions presented. The presented embodiments are given as example only, and are not exhaustive of the scope of the technical solutions presented herein. Accordingly, the scope of protection is not limited to the preferred embodiments described in the specification, but is only limited by the claims that follow.

The invention claimed is:

1. A method for calibration of Time-of-Flight Positron Emission Tomography (TOF-PET) detectors comprising polymeric scintillator strips and photoelectric converters, wherein cosmic radiation is used as a source of radiation, the method comprising the steps of:
   recording times of reactions of particles of cosmic radiation with the scintillator strips;
   determining spectra of distribution of differences in the times at which pulses are recorded at ends of the scintillator strips connected to photoelectric converters;
   using the determined spectra to determine timing synchronization constants of the photoelectric converters, the constants being related to:
      delays within the electronics;
      speed of light propagation within the scintillator strip of the detection module; and
      resolution of the difference in times of the signals recorded at the ends of the module.

2. The method according to claim 1, comprising measuring a charge ($Q_A$, $Q_B$) at the ends of the scintillator connected to the photoelectric converters, wherein the charge is a result of the reaction of the particle of cosmic radiation with the scintillator and determining an effective light pulse attenuation length and amplification coefficients of the photoelectric converters to be used to determine calibration constants of energy synchronization of the detectors.

3. The method according to claim 2, comprising determining a reference function separately for each detector by measuring charges ($Q_A$, $Q_B$) that correspond to losses in energy being deposited at distinct, precisely identified places of reactions of the particles of cosmic radiation (x).

4. The method according to claim 1, comprising mutually calibrating at least two TOF-PET detectors by measuring the time of flight (TOF) of the particle of cosmic radiation across the scintillators of two detectors; determining the distance traveled by the particle between two scintillator strips; and determining relative time delays between the detection modules on the basis of a difference between the measured time of flight of the particle and the time of flight calculated from the distribution of particle speeds at Earth's surface.

5. The method according to claim 1, comprising mutually calibrating at least two TOF-PET detectors by: acquiring reference spectra of times of flight of particles of cosmic radiation across two detectors; wherein the reference spectra are acquired by determining times of flight of the particles between two scintillators aligned in parallel one over the other, acquiring of the spectra of times of flight of the particles between the detectors, inverting the order of detectors and acquiring the reference spectra of times of flight of the particles between the same scintillators aligned in parallel one over the other in a reverse order, and subsequently acquiring reference spectra of the times of flight of the particles between the detectors; wherein the values of the delays of the detection modules are selected by fitting the spectra of the times of flight of the particles across the two detectors to the reference spectra of the times of flight of the particles with the detection module pair delays as free fitting parameters.

6. The method according to claim 5, wherein the spectra of the particle speeds are fitted to the reference spectra of the particle speeds.

7. The method according to claim 5, wherein the reference spectra are acquired for any configuration of detector pairs within the TOF-PET scanner.

* * * * *